United States Patent
Kubo

(10) Patent No.: US 9,682,712 B2
(45) Date of Patent: Jun. 20, 2017

(54) OVERTAKING ASSISTANT SYSTEM FOR NOTIFYING A DRIVER THAT IT IS SAFE TO OVERTAKE ANOTHER VEHICLE

(71) Applicant: VOLVO TRUCK CORPORATION, Gothenburg (SE)

(72) Inventor: Tomoki Kubo, Saitama (JP)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 14/899,658

(22) PCT Filed: Jun. 18, 2013

(86) PCT No.: PCT/JP2013/066724
§ 371 (c)(1),
(2) Date: Dec. 18, 2015

(87) PCT Pub. No.: WO2014/203333
PCT Pub. Date: Dec. 24, 2014

(65) Prior Publication Data
US 2016/0129919 A1    May 12, 2016

(51) Int. Cl.
| | |
|---|---|
| G08B 21/00 | (2006.01) |
| B60W 50/14 | (2012.01) |
| G08G 1/16 | (2006.01) |
| B60W 40/04 | (2006.01) |
| B60W 40/105 | (2012.01) |

(52) U.S. Cl.
CPC ............ *B60W 50/14* (2013.01); *B60W 40/04* (2013.01); *B60W 40/105* (2013.01); *G08G 1/167* (2013.01)

(58) Field of Classification Search
CPC .................................................. B60W 50/14
USPC ..... 340/435, 436, 441, 901, 903; 701/1, 301
See application file for complete search history.

(56) References Cited

U.S. PATENT DOCUMENTS

| | | |
|---|---|---|
| 5,521,579 A | 5/1996 | Bernhard |
| 6,842,687 B2 | 1/2005 | Winner et al. |
| 8,620,571 B2 | 12/2013 | Konishi |

(Continued)

FOREIGN PATENT DOCUMENTS

| | | |
|---|---|---|
| CN | 1218355 A | 6/1999 |
| CN | 101870292 A | 10/2010 |
| CN | 102686468 A | 9/2012 |

(Continued)

*Primary Examiner* — Jeffery Hofsass
(74) *Attorney, Agent, or Firm* — Laurence A. Greenberg; Werner H. Stemer; Ralph E. Locher

(57) ABSTRACT

An overtaking assistant system includes a speed detector that detects a speed of a host vehicle, a preceding vehicle detector capable of relative distances and relative speeds of a first vehicle traveling along a slow lane before the host vehicle and a second vehicle traveling along a passing lane before the host vehicle with respect to the host vehicle while the host vehicle travels along the slow lane, a first speed comparison unit that compares speeds between the first and second vehicles, an overtaking decision making unit that determines that the host vehicle is allowed to overtake the first vehicle when the speed of the host vehicle is higher than the first vehicle, and the speed of the second vehicle is higher than the speed of the first vehicle, and a notification unit that notifies a driver of the host vehicle that the host vehicle is allowed to overtake the first vehicle when the overtaking decision making unit determines that the host vehicle is allowed to overtake the first vehicle.

3 Claims, 8 Drawing Sheets

(56) References Cited

U.S. PATENT DOCUMENTS

2012/0265431 A1 10/2012 Hayakawa et al.

FOREIGN PATENT DOCUMENTS

| DE | 102005023185 A1 | 11/2006 |
| DE | 102011076085 A1 | 11/2012 |
| JP | 2004525814 A | 8/2004 |
| JP | 2006178714 A | 7/2006 |
| JP | 2009193228 A | 8/2009 |
| JP | 2009230377 A | 10/2009 |
| JP | 2012001042 A | 1/2012 |

OVERTAKING ASSISTANT SYSTEM FOR NOTIFYING A DRIVER THAT IT IS SAFE TO OVERTAKE ANOTHER VEHICLE

TECHNICAL FIELD

The present invention relates to an overtaking assistant system for assisting a host vehicle to overtake a preceding vehicle.

BACKGROUND ART

In the prior art, there is known a driving gap control device that detects a preceding vehicle traveling before a host vehicle and controls a vehicle speed to maintain a predetermined safe driving gap.

In JP 2009-193228 A, there is discussed a driving gap control device that notifies a driver of a lane change timing when a driving gap between a host vehicle and a preceding vehicle is within a predetermined gap necessary to perform a lane change of the host vehicle, and any other vehicle is not detected behind the host vehicle.

SUMMARY OF INVENTION

However, in the driving gap control device discussed in JP 2009-193228 A, deceleration may be necessary in some times, for example, when there is another preceding vehicle traveling along a destination lane to be changed to overtake the preceding vehicle. For this reason, it is necessary to perform acceleration or deceleration, and this may increase fuel consumption.

In view of the aforementioned problems, it is therefore an object of the present invention to provide an overtaking assistant system capable of allowing a driver to perform fuel saving driving by reducing acceleration or deceleration.

According to one aspect of the present invention, an overtaking assistant system for notifying a driver whether or not a host vehicle is allowed to overtake a first vehicle traveling along a slow lane before the host vehicle when the host vehicle travels along the slow lane, the overtaking assistant system includes a speed detector configured to detect a speed of the host vehicle; a preceding vehicle detector configured to detect relative distances and relative speeds of the first vehicle and a second vehicle, the second vehicle traveling along a passing line before the host vehicle with respect to the host vehicle; a speed comparison unit configured to compare speeds of the first and second vehicles; an overtaking decision making unit configured to determine that the host vehicle is allowed to overtake the first vehicle if the speed of the host vehicle is higher than the speed of the first vehicle and the speed of the second vehicle is higher than the speed of the first vehicle; and a notification unit configured to notify a driver of the host vehicle that the host vehicle is allowed to overtake the first vehicle when the overtaking decision making unit determines that the host vehicle is allowed to overtake the first vehicle.

The details as well as other features and advantages of this invention are set forth in the remainder of the specification and are shown in the accompanying drawings.

DESCRIPTION OF EMBODIMENTS

A description will now be made for an overtaking assistant system 100 according to an embodiment of this invention with reference to the accompanying drawings.

Figure 1:
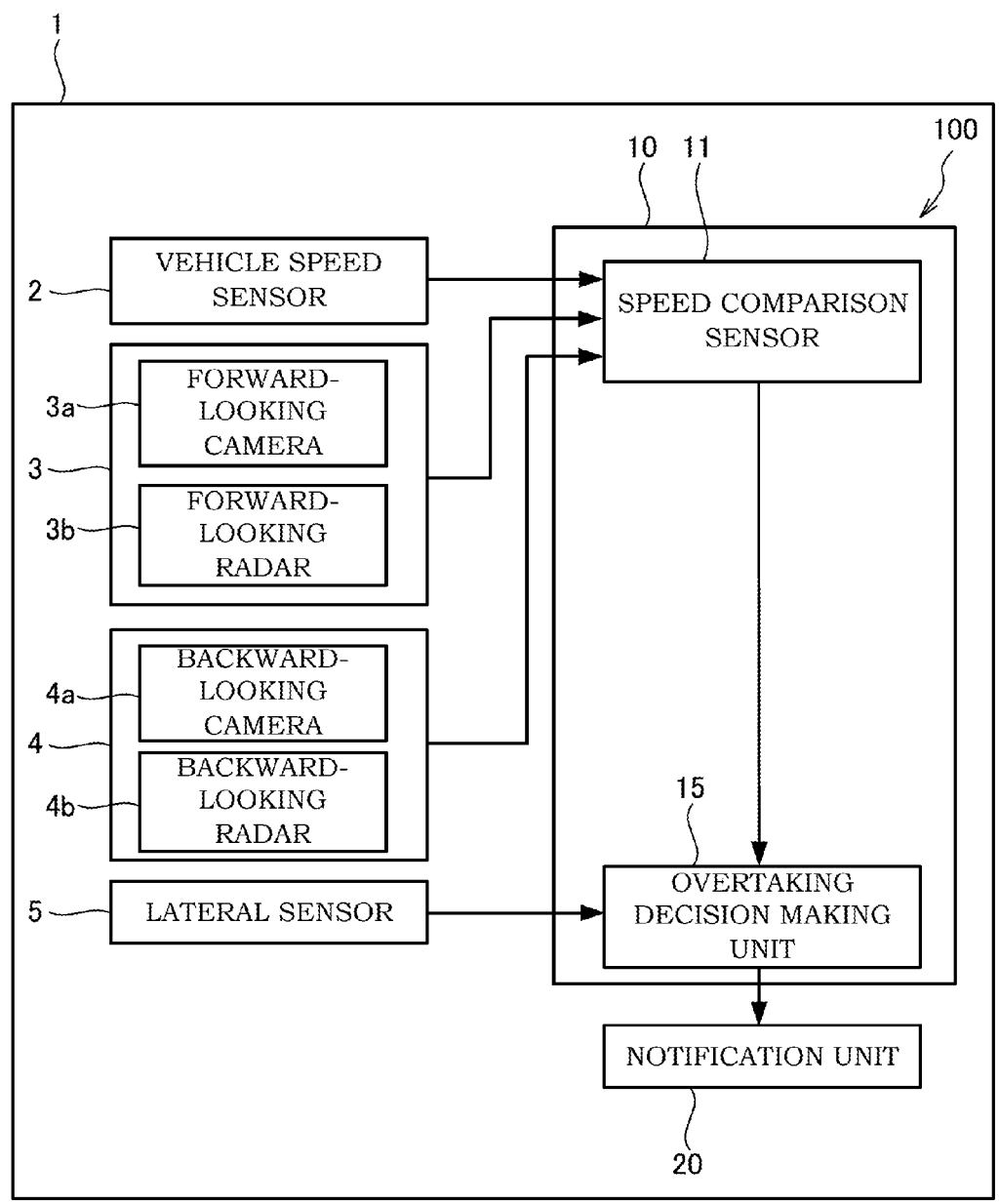
FIG. 1 is a block diagram illustrating an overtaking assistant system according to an embodiment of this invention.

First, a configuration of the overtaking assistant system 100 will be described with reference to FIG. 1.

The overtaking assistant system 100 is mounted on a vehicle 1 as a host vehicle. The overtaking assistant system 100 aims to notify a driver of the vehicle 1 whether or not the vehicle 1 is allowed to overtake other preceding vehicles traveling along a slow lane when the vehicle 1 travels along the slow lane. The overtaking assistant system 100 determines whether or not the vehicle 1 is allowed to overtake other preceding vehicles traveling along the slow lane by assuming that the vehicle 1 and other vehicles traveling around the vehicle 1 continuously run as they are.

The overtaking assistant system 100 is also incorporated with a fuel saving driving system (not shown) for implementing fuel saving driving by suppressing fuel consumption during a travel of the vehicle 1. This fuel saving driving system is connected to an engine electronic control unit (ECU) that performs the engine control, to control the fuel amount supplied to the engine. The fuel saving driving system suppresses the fuel consumption by performing inertia traveling by limiting the fuel amount supplied to the engine on the basis of road slope information stored in a database.

The overtaking assistant system 100 includes a vehicle speed sensor 2 as a speed detector for detecting a speed of the vehicle 1, a preceding vehicle detector 3 capable of detecting other vehicles traveling before the vehicle 1, a following vehicle detector 4 capable of detecting other vehicles traveling behind the vehicle 1, a lateral sensor 5 as a side vehicle detector capable of detecting other vehicles traveling in a lateral side of the vehicle 1, a controller 10 that performs a control, and a notification unit 20 that notifies a driver of the vehicle 1 whether or not the vehicle 1 is allowed to overtake other vehicles.

The vehicle speed sensor 2 is a sensor mounted to a vehicle to detect a rotation of an output shaft of a transmission. The vehicle speed may be detected by using the ECU that controls the vehicle without separately providing the vehicle speed sensor 2.

The preceding vehicle detector 3 has a forward-looking camera 3a that captures a forward image of the vehicle 1 and a forward-looking radar 3b that detects relative distances and relative speeds of other vehicles traveling before the vehicle 1.

The forward-looking camera 3a recognizes a type of the traffic lane where the vehicle 1 travels, types of other preceding vehicles, and the like from the captured image. Here, the type of the traffic lane includes a slow lane or a passing lane, and the type of the preceding vehicle includes a light car, a standard-sized car, a medium-sized car, a large-sized car, a trailer, and the like.

The forward-looking radar 3b is, for example, a millimetric wave radar. The forward-looking radar 3b emits a radio wave having a wavelength range of 1 to 10 millimeters and measures the time elapsing until its reflection wave is received in order to detect relative distances and relative speeds between the vehicle 1 and other vehicles traveling before the vehicle 1.

Similarly, the following vehicle detector 4 has a backward-looking camera 4a that captures a backward image of the vehicle 1 and a backward-looking radar 4b that detects relative distances and relative speeds between the vehicle 1 and other vehicles traveling behind the travel 1.

The backward-looking camera 4a recognizes a type of the traffic line where the vehicle 1 travels and a type of the following vehicle from the captured image.

The backward-looking radar 4b is, for example, a millimetric wave radar. The backward-looking radar 4b emits a radio wave having a wavelength range of 1 to 10 millimeters and measures the time elapsing until its reflection wave is received in order to detect relative distances and relative speeds between the vehicle 1 and other vehicles traveling behind the vehicle 1.

The controller 10 is a microcomputer having a central processing unit (CPU), a read-only memory (ROM), a random access memory (RAM), and an input/output (I/O) interface. The RAM stores data necessary in the processing of the CPU. The ROM stores a CPU control program and the like in advance. The I/O interface is used in an input/output operation of information with connected devices. The control of the overtaking assistant system 100 is implemented by operating the CPU, the RAM, and the like on the basis of the program stored in the ROM.

The controller 10 is connected to the vehicle speed sensor 2, the preceding vehicle detector 3, the following vehicle detector 4, and the lateral sensor 5 by way of the I/O interface to receive signals from each of the sensors 2 to 5.

The controller 10 has a speed comparison unit 11 that compares the speed of the vehicle 1 with the speeds of other vehicles or compares the speeds of other vehicles, and an overtaking decision making unit 15 that determines whether or not the vehicle 1 is allowed to overtake other vehicles on the basis of the relative distances and the relative speeds between the vehicle 1 and other vehicles. The speed comparison unit 11 and the overtaking decision making unit 15 will be described below in detail with reference to FIG. 3.

The notification unit 20 audibly or visually notifies a driver of the vehicle 1 whether or not the vehicle 1 is allowed to overtake other vehicles. When the overtaking decision making unit 15 determines that the vehicle 1 is allowed to overtake the vehicle 51, the notification unit 20 may notify this fact to a driver of the vehicle 1. The notification unit 20 is provided in a cabin of the vehicle 1. The notification unit 20 includes a liquid crystal display panel provided in a place recognizable by a driver, a loudspeaker that makes a sound in the cabin, or the like. Both the liquid crystal display panel and the loudspeaker may also be provided together as the notification unit 20.

Next, a description will be made for operations of the overtaking assistant system 100 with reference to FIGS. 2 to 8.

Figure 2:
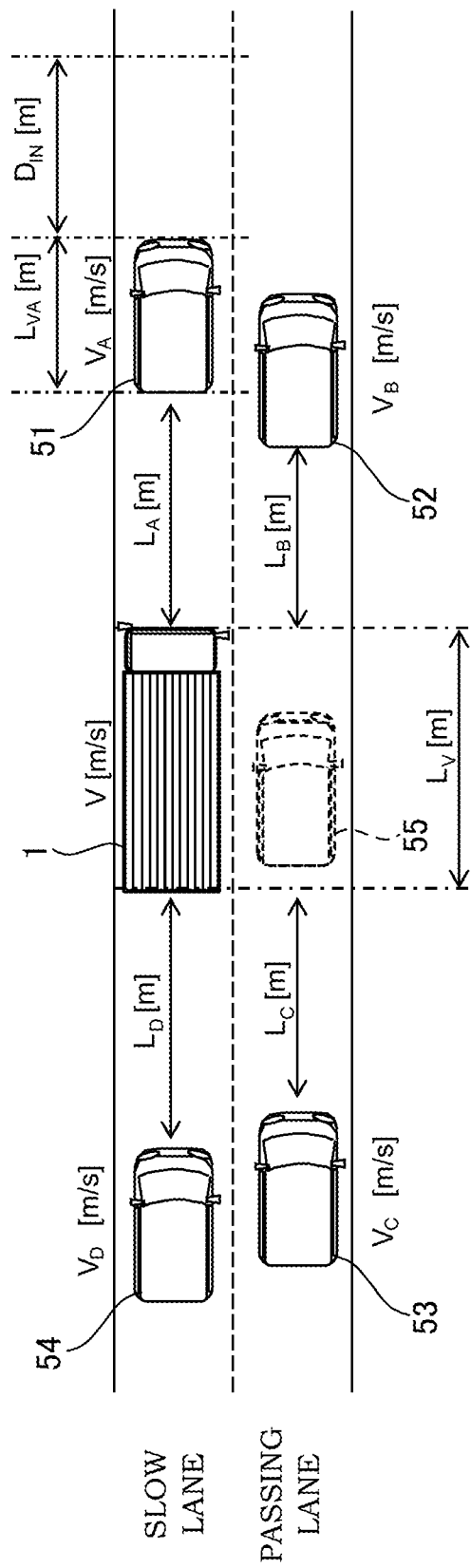
FIG. 2 is a diagram illustrating a positional relationship between a host vehicle and other vehicles including first to fifth vehicles.

First, positions of other vehicles 51 to 55 with respect to the vehicle 1 and various parameters used in the description will be described with reference to FIG. 2.

The overtaking assistant system 100 is operated when the vehicle 1 travels along a slow lane, and the vehicles 51 to 55 travel in the same direction around the vehicle 1. Here, a speed of the vehicle 1 is denoted by "V [m/s]," and the entire length of the vehicle 1 is denoted by "$L_V$ [m]."

The vehicle 51 as a first vehicle travels along the slow lane before the vehicle 1. This vehicle 51 is an overtaking target of the vehicle 1. The vehicle 1 can detect the vehicle 51 by using the preceding vehicle detector 3. Here, the speed of the vehicle 51 is denoted by "$V_A$ [m/s]," the entire length of the vehicle 51 is denoted by "$L_{VA}$ [m]," and a driving gap between the vehicles 1 and 51 is denoted by "$L_A$ [m]." In addition, a safety distance from the vehicle 51 necessary to obtain when the vehicle 1 returns from the passing lane to the slow lane after overtaking the vehicle 51 is denoted by "$D_{IN}$ [m]."

Here, the entire length $L_{VA}$ of the vehicle 51 is a value preset depending on a type of the vehicle. For example, when the vehicle 51 is a standard-sized car, the entire length $L_{VA}$ is set to approximately 6 [m]. When the vehicle 51 is a large-sized truck, the entire length $L_{VA}$ is set to approximately 12 [m]. Furthermore, the safety distance $D_{IN}$ is a value preset depending on a traveling speed of the vehicle 1. For example, when the vehicle 1 travels at a speed of 80 [km/h] (=22.2 [m/s]), the safety distance $D_{IN}$ is set to approximately 50 [m].

The vehicle 52 as a second vehicle travels along the passing lane before the vehicle 1. The vehicle 1 can detect the vehicle 52 by using the preceding vehicle detector 3. Here, the speed of the vehicle 52 is denoted by "$V_B$ [m/s]," and the driving gap between the vehicles 1 and 52 is denoted by "$L_B$ [m]."

The vehicle 53 as a third vehicle travels along the passing lane behind the vehicle 1. The vehicle 1 can detect the vehicle 53 by using the following vehicle detector 4. Here, the speed of the vehicle 53 is denoted by "$V_C$ [m/s]," and the driving gap between the vehicles 1 and 53 is denoted by "$L_C$ [m]."

The vehicle 54 as a fourth vehicle travels along the slow lane behind the vehicle 1. The vehicle 1 can detect the vehicle 54 by using the following vehicle detector 4. Here, the speed of the vehicle 54 is denoted by "$V_D$ [m/s]," and the driving gap between the vehicles 1 and 54 is denoted by "$L_D$ [m]."

The vehicle 55 as a fifth vehicle travels along the passing lane in the right side of the vehicle 1. The vehicle 1 can detect the vehicle 55 by using the lateral sensor 5. Here, it is assumed that the vehicle 1 is driven on the left-hand side of the road. If the vehicle 1 is driven on the right-hand side of the road, it is assumed that the vehicle 55 travels along the passing lane in the left side of the vehicle 1.

Figure 3:
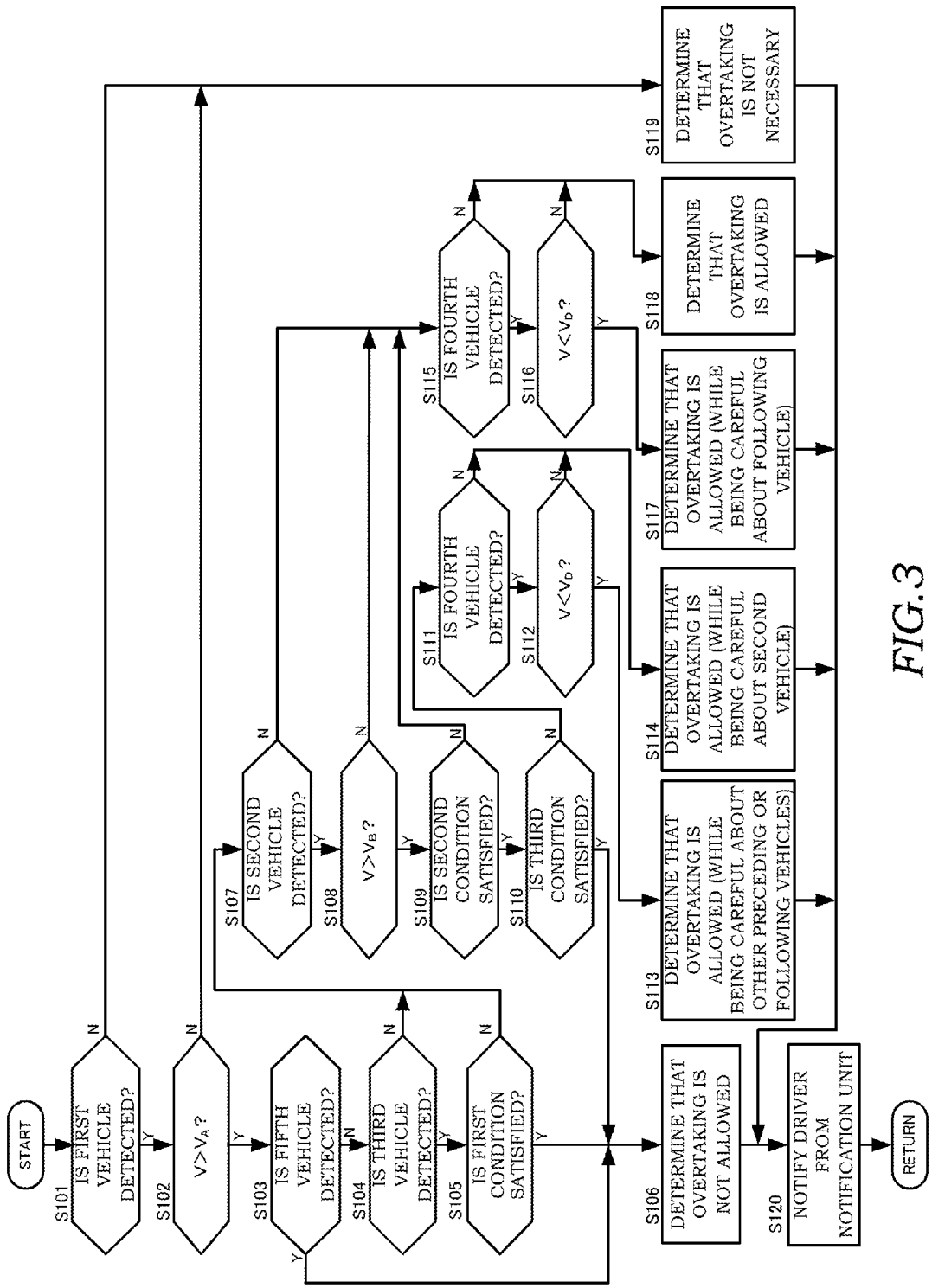
FIG. 3 is a flowchart illustrating a control process of the overtaking assistant system.
Figure 4:
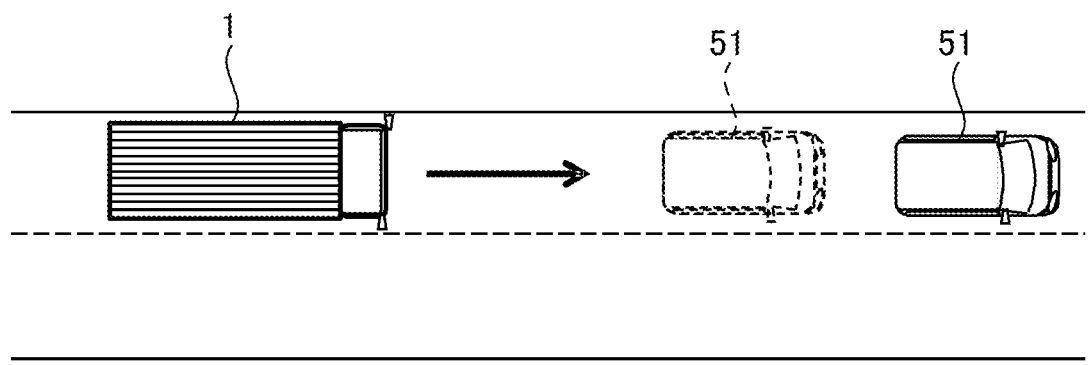
FIG. 4 is a diagram illustrating a case where another vehicle travels along a slow lane before the host vehicle.

Next, a description will be made for operations of the overtaking assistant system 100 with reference to FIGS. 3 to 8. The routine of FIG. 3 is executed by the controller 10 repeatedly and periodically, for example, in every 10 milliseconds.

In the step 101, it is determined whether or not the preceding vehicle detector 3 detects the vehicle 51. If it is determined that the preceding vehicle detector 3 detects the vehicle 51 in the step 101, an overtaking target 51 exists, so that the process advances to the step 102. Otherwise, if it is determined that the preceding vehicle detector 3 does not detect the vehicle 51 in the step 101, there is no overtaking target 51, so that the process advances to the step 119.

In the step 102, the speed comparison unit 11 compares the speed V of the vehicle 1 and the speed $V_A$ of the vehicle 51 to determine whether or not the speed V of the vehicle 1 is higher than the speed $V_A$ of the vehicle 51. If it is determined the speed V of the vehicle 1 is higher than the speed $V_A$ of the vehicle 51 in the step 102, the process advances to the step 103. This is the case where, assuming that the vehicles 1 and 51 continuously run as they are, the vehicle 1 approaches the vehicle 51 as indicated by the dotted line in FIG. 4.

Meanwhile, if it is determined that the speed V of the vehicle 1 is not higher than the speed $V_A$ of the vehicle 51, that is, if it is determined that the speed V of the vehicle 1 is equal to or lower than the speed $V_A$ of the vehicle 51 in the step 102, it is not necessary to overtake the vehicle 51, and the process advances to the step 119.

In the step 103, it is determined whether or not the lateral sensor 5 detects the vehicle 55. If it is determined that the vehicle 55 is detected in the step 103, the vehicle 1 is not allowed to perform a lane change, and the process advances to the step 106. Otherwise, if it is determined that the vehicle 55 is not detected in the step 103, the process advances to the step 104. Therefore, the overtaking decision making unit 15 may determine that the vehicle 1 is allowed to overtake the vehicle 51 if the vehicle 55 is not detected.

In the step 104, it is determined whether or not the following vehicle detector 4 detects the vehicle 53. If it is determined that the vehicle 53 is detected in the step 104, the process advances to the step 105. Otherwise, if it is determined that the vehicle 53 is not detected in the step 104, the process advances to the step 107.

Figure 5:
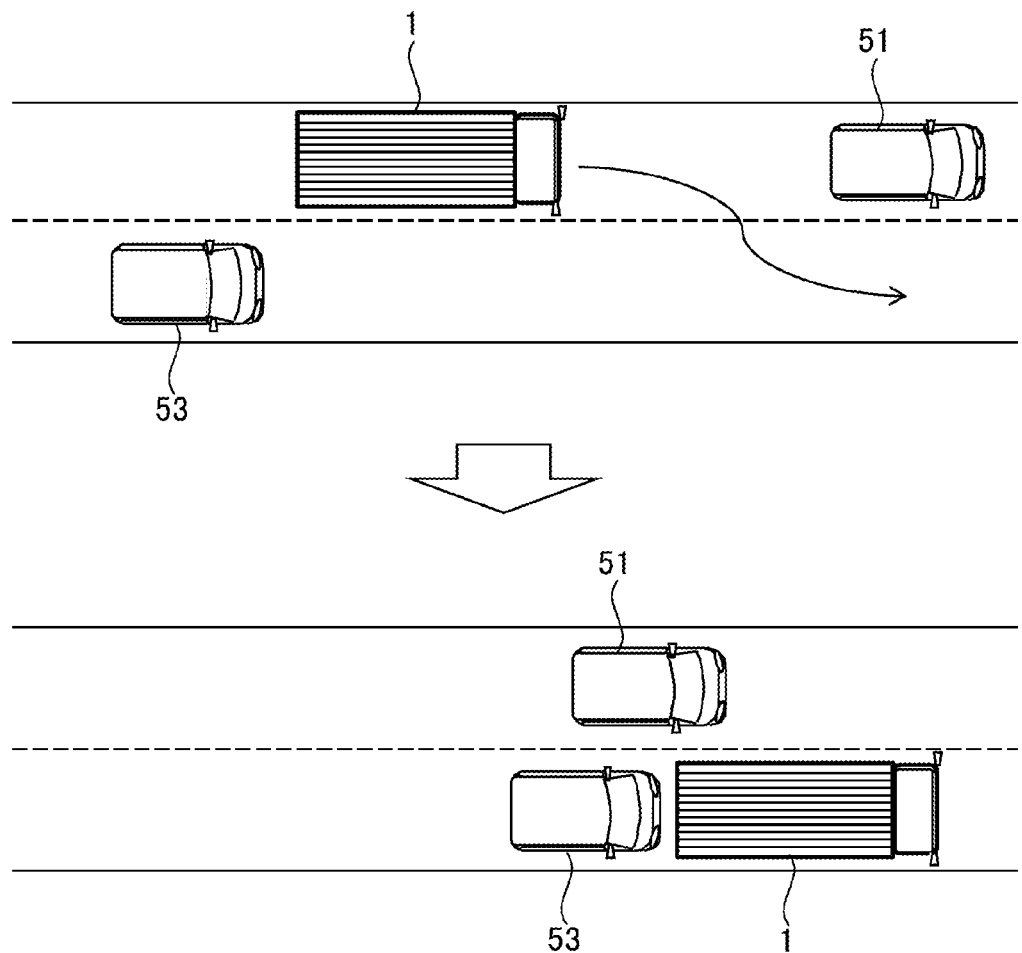
FIG. 5 is a diagram illustrating a first condition.

In the step 105, it is determined whether or not a positional relationship between the vehicles 1, 51, and 53 satisfies a first condition. The first condition is defined as "$T_A > t_A$," where "$T_A$ [s]" denotes a time period necessary for the vehicle 1 to overtake the vehicle 51, and "$t_A$ [s]" denotes a time period elapsing until the vehicle 53 catches up with the vehicle 1. That is, the first condition is defined such that the vehicle 53 catches up with the vehicle 1 while the vehicle 1 overtakes the vehicle 51 as illustrated in FIG. 5 by assuming that the vehicles 1, 51, and 53 continuously run as they are. The time period $T_A$ is obtained from a formula "$T_A = (L_A + L_{VA} + D_{IN})/(V - V_A)$" and the time period $t_A$ is obtained from a formula "$t_A = L_C/(V_C - V)$."

If it is determined that the first condition is satisfied in the step 105, the vehicle 1 is not allowed to overtake the vehicle 51 in consideration of the relationship with the vehicle 53, and the process advances to the step 106. Otherwise, if it is determined that the first condition is not satisfied in the step 105, the vehicle 1 is allowed to overtake the vehicle 51 in consideration of the relationship with the vehicle 53, and the process advances to the step 107. Therefore, the overtaking decision making unit 15 may determine that the vehicle 1 is allowed to overtake the vehicle 51 if the vehicle 53 does not catch up with the vehicle 1 while the vehicle 1 overtakes the vehicle 51 by assuming that the vehicles 1, 51, and 53 continuously run as they are.

In the step 106, the overtaking decision making unit 15 determines that the vehicle 1 is not allowed to overtake the vehicle 51. In this case, in steps 101 and 102, it is determined that the vehicle 51 exists, and the speed V of the vehicle 1 is higher than the speed $V_A$ of the vehicle 51. Therefore, it is necessary to reduce the speed of the vehicle 1.

In the step 120, the notification unit 20 notifies a driver of the vehicle 1 that the vehicle 1 is not allowed to overtake the vehicle 51, and it is necessary to reduce the speed because the vehicle 1 may catch up with the vehicle 51 if there is no speed change. The driver of the vehicle 1 notified of this fact may continuously drive the vehicle 1 along the slow lane while being careful about the driving gap from the vehicle 51.

Meanwhile, in the step 107, it is determined whether or not the preceding vehicle detector 3 detects the vehicle 52. If it is determined that the vehicle 52 is detected in the step 107, the process advances to the step 108. Otherwise, if it is determined that vehicle 52 is not detected in the step 107, the process advances to the step 115.

In the step 108, the speed comparison unit 11 compares the speed V of the vehicle 1 and the speed $V_B$ of the vehicle 52 to determine whether or not the speed V of the vehicle 1 is higher than the speed $V_B$ of the vehicle 52. If it is determined that the speed V of the vehicle 1 is higher than the speed $V_B$ of the vehicle 52 in the step 108, the process advances to the step 109. Otherwise, if it is determined in the step 108 that the speed V of the vehicle 1 is not higher than the speed $V_B$ of the vehicle 52, that is, if it is determined that the speed V of the vehicle 1 is equal to or lower than the speed $V_B$ of the vehicle 52, the process advances to the step 115.

Figure 6:
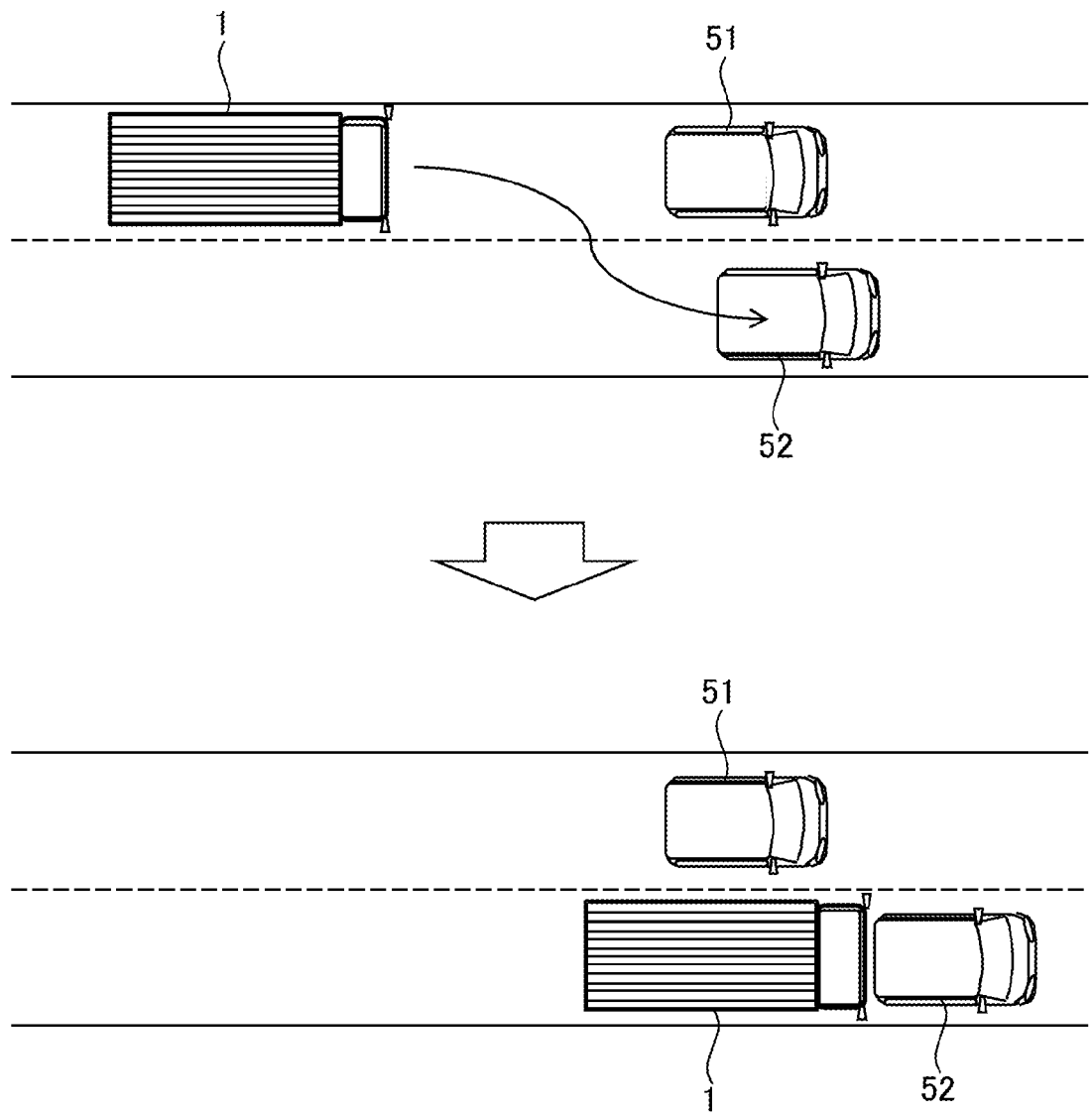
FIG. 6 is a diagram illustrating a second condition.

In the step 109, it is determined whether or not a positional relationship between the vehicles 1, 51, and 52 satisfies a second condition. The second condition is defined as "$T_A > t_B$," where "$T_A$ [s]" denotes a time period necessary for the vehicle 1 to overtake the vehicle 51, and "$t_B$ [s]" denotes a time period elapsing until the vehicle 1 catches up with the vehicle 52. That is, the second condition is defined such that the vehicle 1 catches up with the vehicle 52 while the vehicle 1 overtakes the vehicle 51 as illustrated in FIG. 6 by assuming that the vehicles 1, 51, and 52 continuously run as they are. Here, the time period $t_B$ is obtained from a formula "$t_B = L_B/(V - V_B)$."

If it is determined that the second condition is satisfied in the step 109, the vehicle 1 will catch up with the vehicle 52 while the vehicle 1 overtakes the vehicle 51. Therefore, the process advances to the step 110. Otherwise, if it is determined that the second condition is not satisfied in the step 109, the vehicle 1 will not catch up with the vehicle 52 while the vehicle 1 overtakes the vehicle 51. Therefore, the process advances to the step 115.

Figure 7:
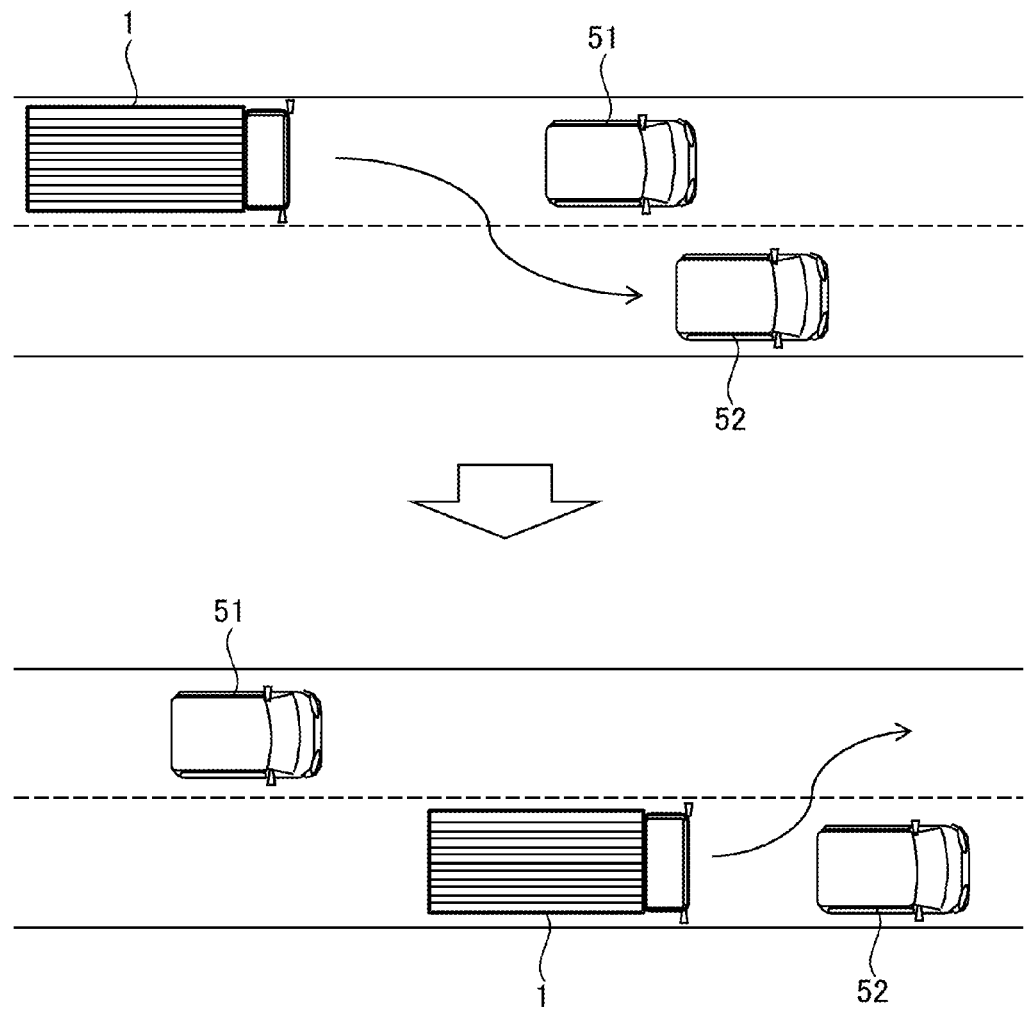
FIG. 7 is a diagram illustrating a third condition.

In the step 110, it is determined whether or not the positional relationship between the vehicles 1, 51, and 52 satisfies a third condition. The third condition is defined as "$V_B - V_A < V_\alpha$," where "$V_\alpha$," denotes a speed difference between the vehicles 51 and 52 at which it can be determined that the vehicle 1 is allowed to overtake the vehicle 51. That is, similar to the second condition, the third condition is defined such that the vehicle 1 catches up with the vehicle 52 while the vehicle 1 overtakes the vehicle 51 as illustrated in FIG. 7 by assuming that the vehicles 1, 51, and 52 continuously run as they are.

If it is determined that the third condition is satisfied in the step 110, the vehicle 1 will catch up with the vehicle 52 while the vehicle 1 overtakes the vehicle 51. Therefore, the process advances to the step 106, where it is determined that the overtaking is not allowed. Otherwise, if it is determined that the third condition is not satisfied in the step 110, the vehicle 1 will not catch up with the vehicle 52 while the vehicle 1 overtakes the vehicle 51. Therefore, the process advances to the step 111.

Here, even if it is determined in the step 109 that the second condition is satisfied, it may be determined in the step 110 that the third condition is not satisfied in some cases depending on a setup value of the speed difference $V_\alpha$. In this case, the process advances to the step 111, and then, it is determined that the vehicle 1 is allowed to overtake the vehicle 51. Therefore, if the speed of the vehicle 1 is higher than the speed of the vehicle 51, and the speed of the vehicle 52 is higher than the speed of the vehicle 51, the overtaking decision making unit 15 may determine that the vehicle 1 is allowed to overtake the vehicle 51.

In this case, even if the vehicle 1 catches up with the vehicle 52 while the vehicle 1 overtakes the vehicle 51, deceleration is smaller when the vehicle 1 follows the vehicle 52 than when the vehicle 1 follows the vehicle 51. Therefore, the driver of the vehicle 1 notified by the notification unit 20 may select one of the slow lane and the passing lane by considering which one will cause less deceleration. Therefore, the driver can make fuel saving driving by reducing acceleration or deceleration.

Figure 8:
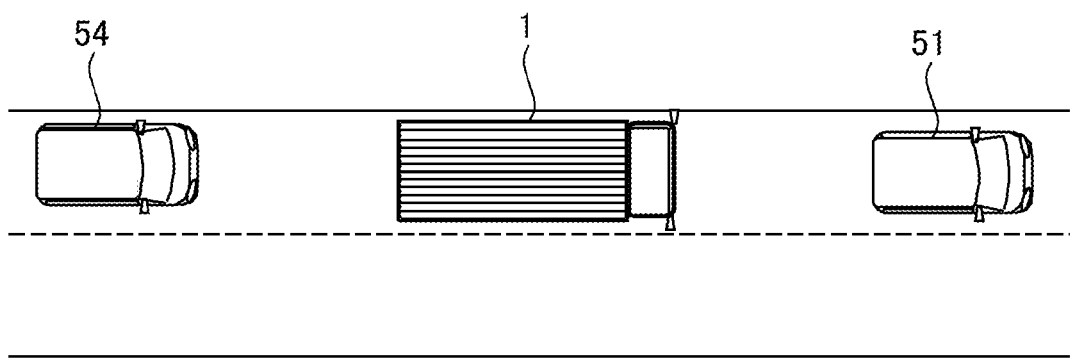
FIG. 8 is a diagram illustrating a case where the host vehicle travels along the slow lane between other vehicles before and behind.

In the step 111, it is determined whether or not the following vehicle detector 4 detects the vehicle 54. If it is determined in the step 111 that the vehicle 54 is detected, the vehicle 54 follows the vehicle 1 as illustrated in FIG. 8, and the process advances to the step 112. Otherwise, if it is determined that the vehicle 54 is not detected in the step 111, the vehicle 54 does not follow the vehicle 1, and the process advances to the step 114.

In the step 112, the speed comparison unit 11 compares the speed V of the vehicle 1 and the speed $V_D$ of the vehicle 54 to determine whether or not the speed V of the vehicle 1 is lower than the speed $V_D$ of the vehicle 54. If it is determined in the step 112 that the speed V of the vehicle 1 is lower than the speed $V_D$ of the vehicle 54, the process advances to the step 113. Otherwise, if it is determined in the step 112 that the speed V of the vehicle 1 is not lower than the speed $V_D$ of the vehicle 54, that is, if it is determined that the speed V of the vehicle 1 is equal to or higher than the speed $V_D$ of the vehicle 54, the process advances to the step 114. Therefore, if the speed of the vehicle 1 is higher than the speed of the vehicle 54, the overtaking decision making unit 15 may determine that the vehicle 1 is allowed to overtake the vehicle 51.

Similar to the step 111, in the step 115, it is determined whether or not the following vehicle detector 4 detects the vehicle 54. If it is determined in the step 115 that the vehicle 54 is detected, the vehicle 54 follows the vehicle 1 as illustrated in FIG. 8, and the process advances to the step 116. Otherwise, if it is determined in the step 115 that the vehicle 54 is not detected, the vehicle 54 does not follow the vehicle 1, and the process advances to the step 118.

Similar to the step 112, in the step 116, the speed comparison unit 11 compares the speed V of the vehicle 1 and the speed $V_D$ of the vehicle 54 to determine whether or not the speed V of the vehicle 1 is lower than the speed $V_D$ of the vehicle 54. If it is determined in the step 116 that the speed V of the vehicle 1 is lower than the speed $V_D$ of the vehicle 54, the process advances to the step 117. Otherwise, if it is determined in the step 116 that the speed V of the vehicle 1 is not lower than the speed $V_D$ of the vehicle 54, that is, if it is determined that the speed V of the vehicle 1 is equal to or higher than the speed $V_D$ of the vehicle 54, the process advances to the step 118. Therefore, the overtaking decision making unit 15 may determine that the vehicle 1 is allowed to overtake the vehicle 51 if the speed of the vehicle 1 is higher than the speed of the vehicle 54.

In the step 113, the overtaking decision making unit 15 determines that it is necessary to be careful about any following or preceding vehicle although the vehicle 1 is allowed to overtake the vehicle 51 in consideration of the relationship with the vehicle 53. In this case, at least the vehicles 51, 52, and 54 run around the vehicle 1. Therefore, although the vehicle 1 is allowed to overtake the vehicle 51, the driver is necessary to be careful about other vehicles 51, 52, and 54.

In the step 120, the notification unit 20 notifies the driver of the vehicle 1 that it is necessary to be careful about the vehicles 52 and 54 although the vehicle 1 is allowed to overtake the vehicle 51. The driver of the vehicle 1 notified of this fact may try to overtake the vehicle 51 by performing a lane change from the slow lane to the passing lane while being careful about the vehicles 52 and 54.

In the step 114, the overtaking decision making unit 15 determines that it is necessary to be careful about the vehicle 52 although the vehicle 1 is allowed to overtake the vehicle 51 in consideration of the relationship with the vehicle 53. In this case, at least the vehicles 51 and 52 run around the vehicle 1. Therefore, it is necessary to be careful about the vehicle 52 although the vehicle 1 is allowed to overtake the vehicle 51.

In the step 120, the notification unit 20 notifies the driver of the vehicle 1 that it is necessary to be careful about the vehicle 52 although the vehicle 1 is allowed to overtake the vehicle 51. The driver of the vehicle 1 notified of this fact may try to overtake the vehicle 51 by performing a lane change from the slow lane to the passing lane while being careful about the vehicle 52.

In the step 117, the overtaking decision making unit 15 determines that it is necessary to be careful about any following vehicle although the vehicle 1 is allowed to overtake the vehicle 51 in consideration of the relationship with the vehicle 53. In this case, at least the vehicles 51 and 54 run around the vehicle 1. Therefore, it is necessary to be careful about the vehicle 54 although the vehicle 1 is allowed to overtake the vehicle 51.

In the step 120, the notification unit 20 notifies the driver of the vehicle 1 that it is necessary to be careful about the vehicle 54 although the vehicle 1 is allowed to overtake the vehicle 51. The driver of the vehicle 1 notified of this fact may try to overtake the vehicle 51 by performing a lane change from the slow lane to the passing lane while being careful about the vehicle 54.

In the step 118, the overtaking decision making unit 15 determines that the vehicle 1 is allowed to overtake the vehicle 51. In this case, at least the vehicle 51 runs around the vehicle 1. In addition, even when the vehicles 52, 53, and 54 run around the vehicle 1, it does not matter in a try for the vehicle 1 to overtake the vehicle 51.

In the step 120, the notification unit 20 notifies the driver of the vehicle 1 that the vehicle 1 is allowed to overtake the vehicle 51. The driver of the vehicle 1 notified of this fact may try to overtake the vehicle 51 by performing a lane change from the slow lane to the passing lane.

In the step 119, the overtaking decision making unit 15 determines that the vehicle 51 does not precede the vehicle 1, or it is not necessary to overtake the vehicle 51 because the speed V of the vehicle 1 is lower than the speed $V_A$ of the vehicle 51.

In the step 120, the notification unit 20 notifies the driver of the vehicle 1 that it is not necessary to overtake the preceding vehicle. The driver of the vehicle 1 notified of this fact may continuously run along the slow lane.

The following effects can be obtained from the aforementioned embodiments.

The preceding vehicle detector 3 detects relative distances and relative speeds of the vehicle 1 with respect to the vehicle 51 traveling along the slow lane before the vehicle 1 and the vehicle 52 traveling along the passing lane, when the vehicle 1 travels along the slow lane. If the speed of the vehicle 1 is higher than the speed of the vehicle 51, and the speed of the vehicle 52 is higher than the speed of the vehicle 51, the overtaking decision making unit 15 determines that the vehicle 1 is allowed to overtake the vehicle 51, and the notification unit 20 notifies the driver of this fact. Therefore, the driver notified of this fact by the notification unit 20 may drive the vehicle 1 by selecting one of the slow lane and the passing lane by considering necessity of deceleration or which lane causes less deceleration. Therefore, the driver can perform fuel saving driving by reducing acceleration or deceleration.

Embodiments of this invention were described above, but the above embodiments are merely examples of applications of this invention, and the technical scope of this invention is not limited to the specific constitutions of the above embodiments.

The embodiments of this invention in which an exclusive property or privilege is claimed are defined as follows:

The invention claimed is:

1. An overtaking assistant system for notifying a driver whether or not a host vehicle is allowed to overtake a first vehicle traveling along a slow lane before the host vehicle when the host vehicle travels along the slow lane, the overtaking assistant system comprising:
    a speed detector configured to detect a speed of the host vehicle;
    a preceding vehicle detector configured to detect relative distances and relative speeds of the first vehicle and a second vehicle, the second vehicle traveling along a passing lane and is in front of the host vehicle;
    a forward-looking camera configured to capture a forward image of the host vehicle, said forward-looking camera being configured to recognize vehicle types including a type of the first vehicle, an entire length of the first vehicle is a preset value depending on the type of the first vehicle;
    a speed comparison unit configured to compare speeds of the first and second vehicles;
    a following vehicle detector configured to detect a relative distance and a relative speed of a third vehicle, the third vehicle traveling along the passing lane behind the host vehicle with respect to the host vehicle;
    an overtaking decision making unit configured to determine that the host vehicle is allowed to overtake the first vehicle if the speed of the host vehicle is higher than a speed of the first vehicle and a speed of the second vehicle is higher than the speed of the first vehicle, said overtaking decision making unit configured to determine that the host vehicle is allowed to overtake the first vehicle if the third vehicle does not catch up with the host vehicle while the host vehicle overtakes the first vehicle having a preset length by assuming that the host vehicle and the first and third vehicles continuously run as they are; and
    a notification unit configured to notify the driver of the host vehicle that the host vehicle is allowed to overtake the first vehicle when said overtaking decision making unit determines that the host vehicle is allowed to overtake the first vehicle.

2. The overtaking assistant system according to claim 1, wherein:
    said following vehicle detector is configured to detect the relative distances and the relative speeds of the third vehicle and a fourth vehicle, the fourth vehicle traveling along the slow lane behind the host vehicle with respect to the host vehicle; and
    said overtaking decision making unit is configured to determine that the host vehicle is allowed to overtake the first vehicle if the speed of the host vehicle is higher than a speed of the fourth vehicle.

3. The overtaking assistant system according to claim 2,
    further comprising a lateral vehicle detector configured to detect a fifth vehicle, the fifth vehicle traveling along the passing lane in a lateral direction of the host vehicle; and
    wherein said overtaking decision making unit is configured to determine that the host vehicle is allowed to overtake the first vehicle if the fifth vehicle is not detected.

* * * * *